United States Patent [19]

Buckley

[11] Patent Number: 4,744,537
[45] Date of Patent: May 17, 1988

[54] HANGER BRACKET

[76] Inventor: Robert R. Buckley, 12400 28th Pl. North, Plymouth, Minn. 55441

[21] Appl. No.: 42,040

[22] Filed: Apr. 24, 1987

[51] Int. Cl.[4] ............................................... E04G 3/00
[52] U.S. Cl. .................................. 248/219.1; 211/107; 248/219.4
[58] Field of Search ............... 248/218.4, 219.4, 219.1, 248/318; 362/431, 396; 211/107, 110, 111; 108/152

[56] References Cited

U.S. PATENT DOCUMENTS

| | | | |
|---|---|---|---|
| 1,357,295 | 11/1920 | McNaughton | 248/231 |
| 2,558,768 | 7/1951 | McCormick | 248/231 |
| 2,899,763 | 8/1959 | Jones | 248/231 X |
| 3,337,988 | 8/1967 | Burton | 248/219.4 X |
| 3,746,294 | 7/1973 | Johnston | 248/231 X |
| 4,189,789 | 2/1980 | Hofstetter | 248/318 X |
| 4,409,907 | 10/1983 | Norton | 248/231 X |
| 4,589,522 | 5/1986 | Shelton | 182/187 |

Primary Examiner—J. Franklin Foss
Attorney, Agent, or Firm—Richard C. Litman

[57] ABSTRACT

An improved hanging device for various applications that is comprised of four major components which are: a hanging bracket, an elastic band, a sling and a shackle. The sling can be used alone or in conjunction with the hanging bracket or shackle to support various devices. No marring or disfacing of the supporting structure is required for use of this device.

5 Claims, 1 Drawing Sheet

HANGER BRACKET

The invention relates to a bracket and sling device, and more particularly to an improved hanging device for hanging lanterns and the like without the marring or disfacing of the supporting structure.

More particularly, the invention is directed toward providing means for the hanging of weighted or heat-emitting objects, while protecting the supporting structure from marring or burning. The invention is particularly suited for uses while camping where a lantern can be hanged from said bracket, attached to a tree.

The bracket of the invention supports an object when said bracket is attached to a structure in such a manner as to minimize the vertical and horizontal displacements on said bracket.

The bracket also applies a looped-rope assembly along the vertical axis of said bracket such that when high tension loads are applied to the bracket, the looped-rope assembly tightens around said supporting structure. This provides a displacement force in the vertical direction of sufficient magnitude to offset the forces asserted in the downward-vertical direction by said object.

DESCRIPTION OF THE PRIOR ART

Various prior art hanging devices and slings and the like, as well as their apparatuses and the method of their construction in general, are known and are found to be exemplary of the U.S. prior art. They are:

| U.S. Pat. No. | Inventor |
| --- | --- |
| 449,153 | H. A. Foster |
| 918,070 | J. F. Menge |
| 4,306,701 | J. T. Martin |

U.S. Pat. No. 4,306,702 concerns a Bracket Mounting for various purposes. It resembles the invention in that it supports an object hanging from its free end. Yet, it differs from the the invention in that it penetrates and mars the supporting structure.

U.S. Pat. No. 918,070 discloses a Campers Torch which bears little resemblance to the invention.

U.S. Pat. No. 449,153 concerns a Hanger for Electric Lamps. It resembles the invention in that it supports a lamp and is comprised of a rod supported by a cord(s). Yet, it does not function in the same manner as either embodiment of the invention.

These patents of known prior uses concern and disclose various types of Hangers and Sling devices of sorts and of various manufactures, and the like, as well as methods of their construction; but none of them, whether taken singly or in combination, disclose the specific details of the combination of the invention in such a way as to bear upon the claims of the present invention.

SUMMARY OF THE INVENTION

The object of the invention is to provide a novel hanging bracket that is safe and efficient in use and lends itself to the hanging of items from the free end of its support arm.

Another object of the invention is to allow the sling and bracket to be used in combination providing a support means for the hanging of bug lights and potted plants. Also two slings used together, one on each end, can be used to support a hammock between two trees.

Another object of this invention is directed further to providing for the attachment of the hanger bracket to a supporting structure such as a tree, without marring or penetrating the supporting structure. This is a considerable improvement over existing practices whereby the supporting structure is penetrated by the pierced ends of the arms of the hanger.

Another object of the invention is to provide a hanging device for heavier objects by displacing most of the weight asserted by the hanging object along the sling. The sling is looped around the supporting structure and attached to the support arm. This implementation allows for the tension to be effectively displaced at the sling-supporting structure junction, the sling-support-arm junction, and along the circumference of the section of the sling that wraps around the structure.

Another object of the invention is directed toward providing a sling which can be used separately to support devices.

Another object of the invention is to provide an attachment to the sling, a shackle, which can be used with the sling to support devices.

These, together with other objects and advantages of the invention reside in the details of the process and the operation thereof, as is more fully hereinafter described and claimed. References are made to the drawings forming a part hereof, wherein like numerals refer to like parts throughout.

DETAILED DESCRIPTION OF PREFERRED EMBODIMENTS

Figure 1:
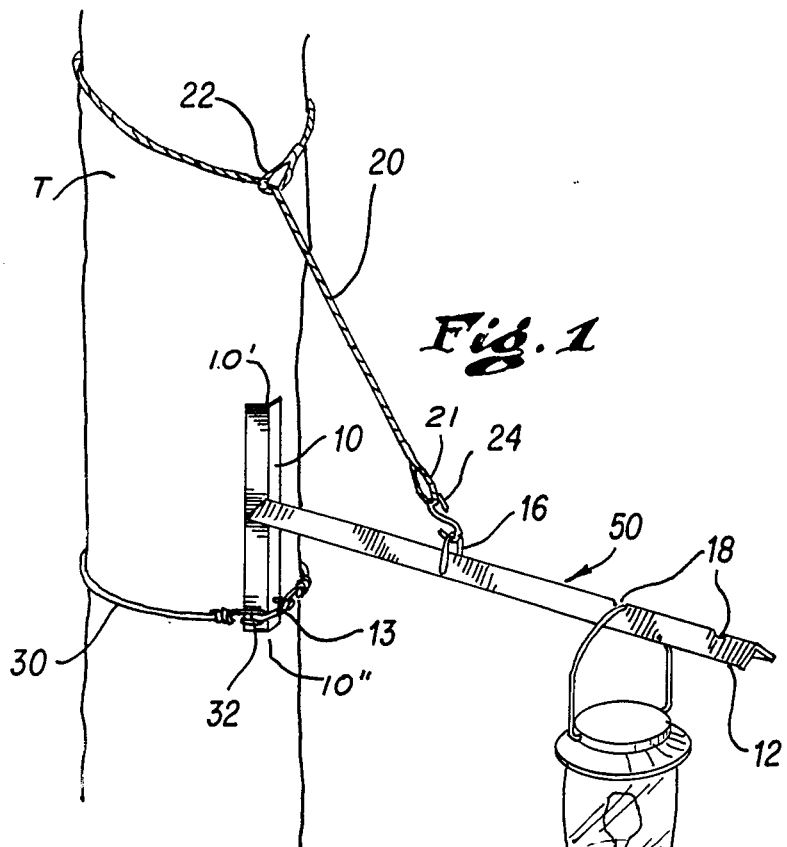
FIG. 1 is a side view of the hanging bracket attached to a tree, supporting a lantern, in accordance with the preferred embodiment and best mode of the invention.

As shown in FIG. 1 the preferred hanging bracket 50 is attached to the face of a tree by the vertical angle bracket 10, preferably constructed of metal, but can also be constructed of other rigid weight supporting material. This vertically disposed angle bracket 10 includes two divergent flanges 11—11 having a top end 10' and bottom end 10" held horizontally stable by the elastic band 30 which is wrapped around a vertical supporting structure, such as the tree T and connected at its ends onto the bottom located horizontal fastener or hook receiving element 13 by two fasteners or hooks 32 made of metal or any other type of weight supporting material. The support arm 12, affixed to the medial portion of the vertical bracket 10 is constructed of rigid material and this assembly is connected to the tree by the rope-comprised sling 20 to restrict its vertical movement. The sling 20 is wrapped around the tree and drawn through its opened-end loop 22 to provide a tight fit against the tree. The sling 20 is connected to the support arm 12 with the hook 24 on the end loop 21 of the sling 20, at either of the two vertical eyes 16. This connection is made on the upward-facing side of the support arm 12. Items, such as the lantern L shown in this drawing FIG. 1 can be supported by the hanging bracket 50 at either groove 18 on the upward-face of the support arm 12, these grooves being located outwardly of the sling attachment 16.

Figure 2:
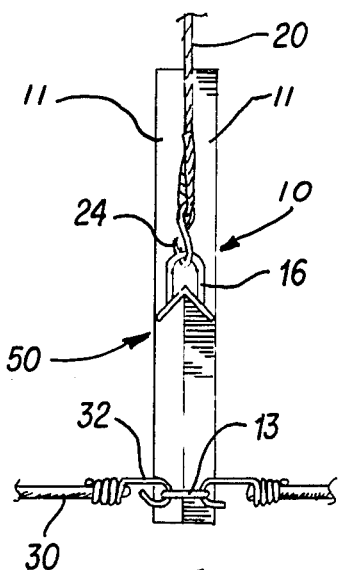
FIG. 2 is a front elevational view of the sling and elastic bank attached to hook members.

As shown in FIG. 2, the rope comprised sling 20 is attached to the vertical eye or fastener receiving element 16 by hook member 24, thus supporting the hanging bracket 50. The elastic band 30 wraps around a supporting structure and attaches to horizontal hook 13 by hooks 32 to further stabilize hanging bracket 50.

Figure 3:
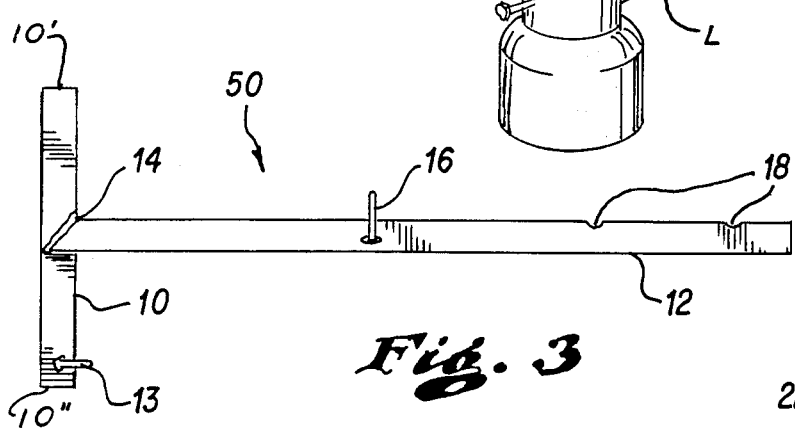
FIG. 3 is a side view of the hanging bracket.

As shown in FIG. 3 the preferred hanging bracket 50 has a vertical angle bracket 10 that is attached to the support arm 12 via a welded joint 14. The vertical angle bracket 10 contains a horizontal hook 13 attached to the side facing the support arm 12. The support arm 12 has a vertical eye 16 attached to its upward facing side. Two grooves 18 are contained on the support arm 12.

Figure 4:
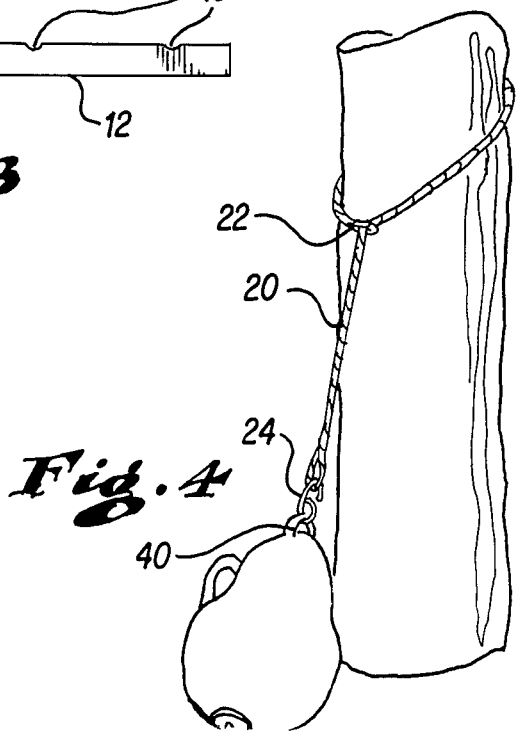
FIG. 4 is a pictorial view of selected basic units attached to a tree, supporting a water dispenser, in accordance with an alternate embodiment of the invention.

As shown in FIG. 4 an alternative embodiment of the invention can be implemented by the sling 20 and shackle 40. The sling 20 can be attached to a supporting structure such as the mast of a sailboat, by wrapping the hook 24 of the sling 20 around the mast and pulling it through the opposite opened-end loop 22 of the sling 20. Objects such as a water jug (shown in figure) and a solar shower jug or other weighted objects could be connected to the hook 24 and hung from the sling 20. A shackle 40 could be used as an attachment when the object to be hanged has no loop in which hook member 24 may be placed.

The foregoing is considered as illustrative only of the principles of the invention. Further, since numerous modifications and changes will readily occur to those skilled in the art, it is not desired to limit the invention to exact construction and operation shown and described, and accordingly, all suitable modifications and equivalents which may be resorted to, fall within the scope of the invention.

What is claimed is:

1. A hanger apparatus for supporting various types of articles in a spaced manner from vertical structures of varying diameters comprising:
   a vertical angle bracket having two longitudinally extending divergent legs terminating in a top end and a bottom end, fastener receiving means on said bracket adjacent said bottom end,
   a substantially horizontally disposed support arm having one end affixed to said vertical angle bracket intermediate said top and bottom ends, a fastener receiving element on said support arm spaced from said vertical angle bracket,
   an elastic band having opposite ends each provided with a fastener element,
   a flexible rope sling having means at one end engageable about a vertical support structure and fastener means at its opposite end, whereby
   said hanger apparatus is attachable to a vertical support structure with said angle bracket flanges engageable therewith and rigidly secured thereto as said elastic band encircles said support structure with said fastener elements attached to said receiving means to hold said bottom end as said rope sling fastener means grasps said support arm receiving element.

2. The hanger apparatus of claim 1 wherein, said support arm comprises an angle member.

3. The hanger apparatus of claim 1 including, a plurality of grooves in said support arm adapted to engage with articles hung therefrom.

4. The hanger apparatus of claim 1 wherein, said fastener elements and fastener means include rigid hooks.

5. The hanger apparatus of claim 1 wherein, said rope sling is substantially non-stretchable.

* * * * *